United States Patent [19]

Klueting et al.

[11] 4,429,919
[45] Feb. 7, 1984

[54] COMPOSITE INERTIA LATCH FOR VEHICLE SEAT BACK

[75] Inventors: Bernd A. Klueting, Radevormwald, Fed. Rep. of Germany; Vikram Zaveri, Springfield, Mich.

[73] Assignee: Keiper Recaro, Inc., Battle Creek, Mich.

[21] Appl. No.: 241,734

[22] Filed: Mar. 9, 1981

[51] Int. Cl.³ .............................................. B60N 1/02
[52] U.S. Cl. .................................... 297/379; 297/216
[58] Field of Search ................................. 297/216, 379

[56] References Cited

U.S. PATENT DOCUMENTS

| | | | |
|---|---|---|---|
| 4,118,067 | 10/1978 | Tanaka | 297/216 X |
| 4,219,234 | 8/1980 | Bell | 297/379 X |
| 4,318,569 | 3/1982 | Bilenchi et al. | 297/379 |

Primary Examiner—William E. Lyddane

[57] ABSTRACT

A passenger car seat back inertia latch providing gravity actuated latch release and deceleration responsive inertia latch retention characterized by a compound resolution of predominant opposing gravity and deceleration forces to provide more sensitive and dependable latch retention at a predetermined minimum emergency vehicle deceleration as well as minimum weight to unlock the latch when the vehicle is stationary over a wider range of seat back adjustment and vehicle inclination than is possible with the conventional simple one-piece inertia latch wherein horizontal and vertical coordinates of the center of gravity relative to a latch pivot are solely depended upon to produce respective opposite gravity actuated release and inertia actuated locking moments on the latch element.

8 Claims, 8 Drawing Figures

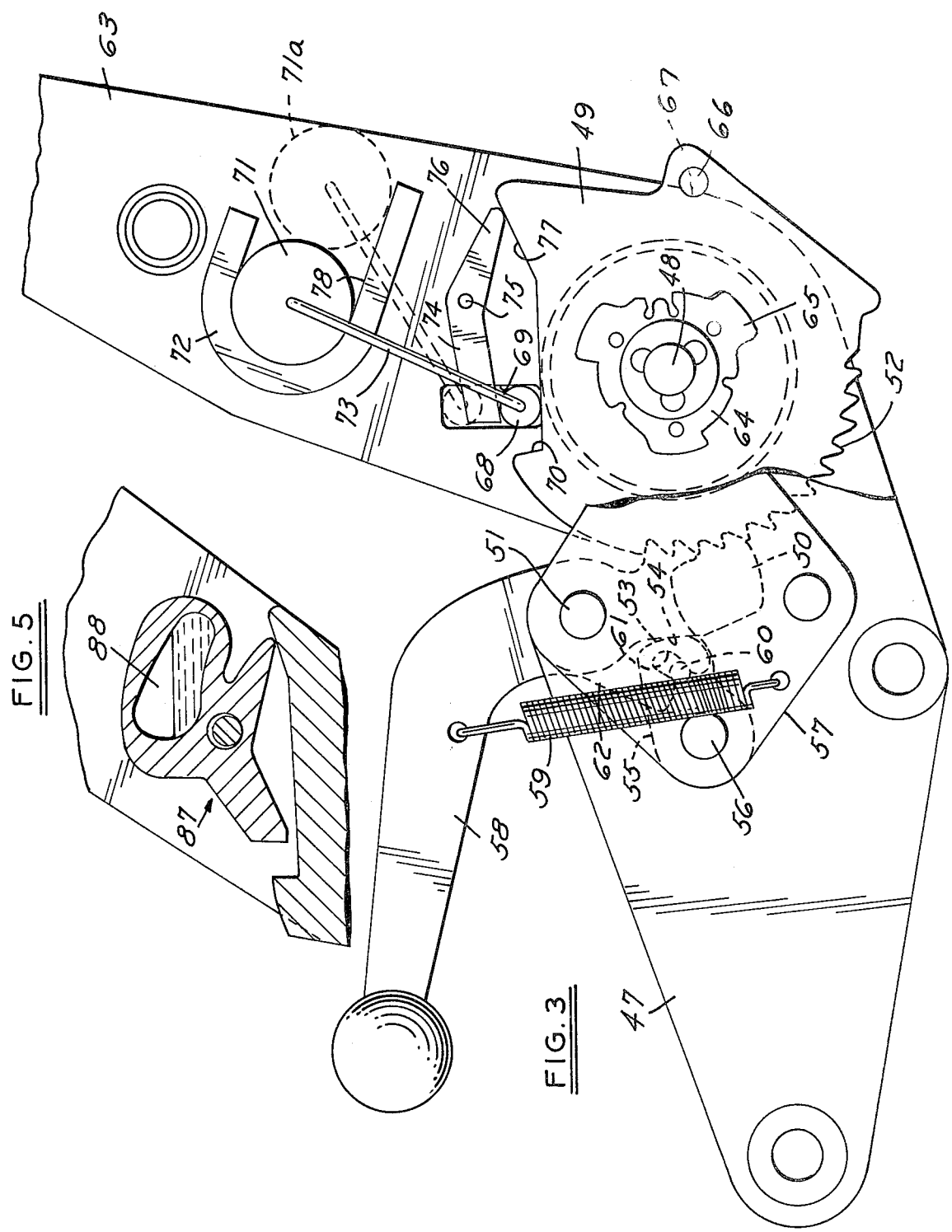

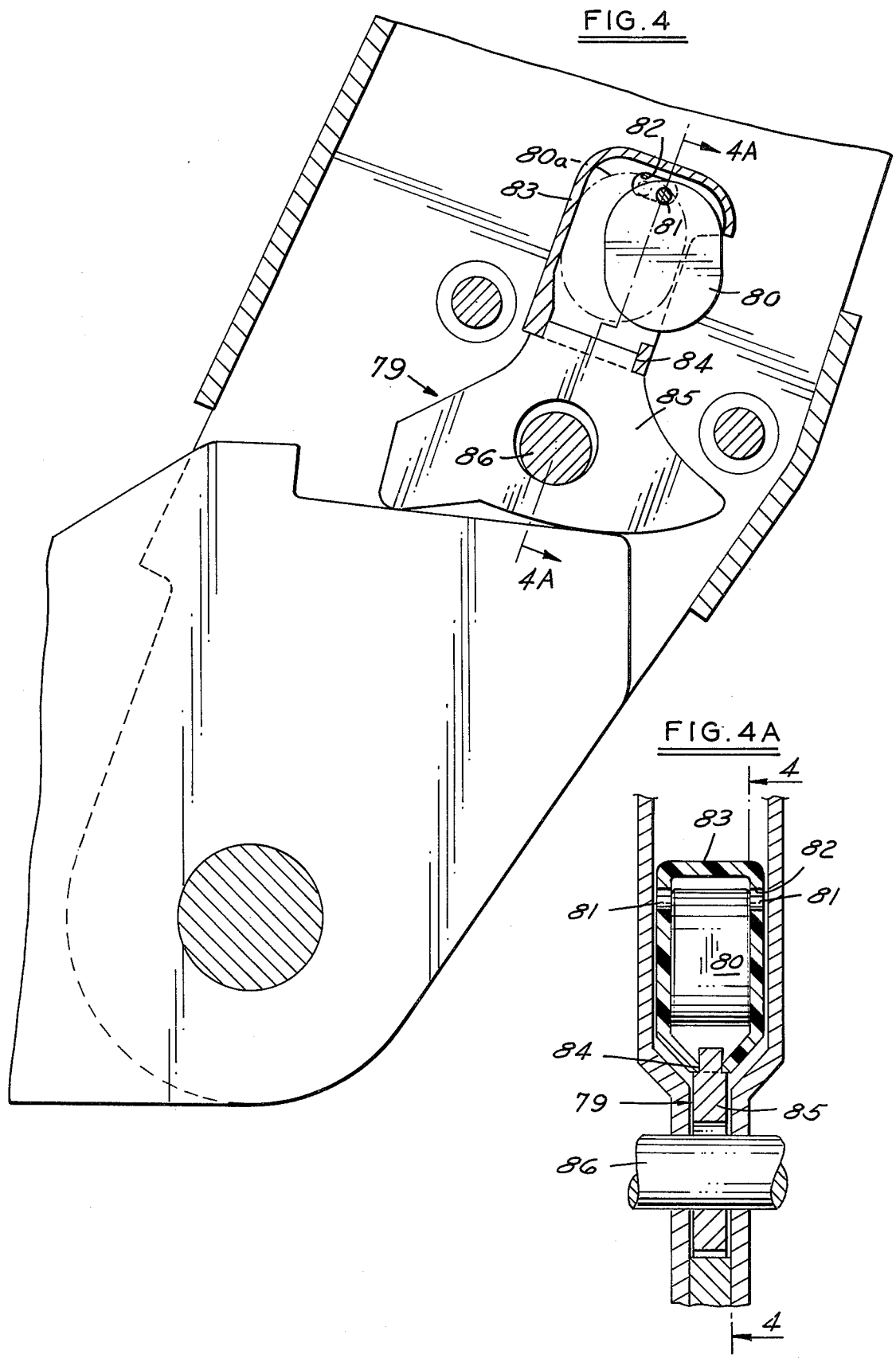

4,429,919

COMPOSITE INERTIA LATCH FOR VEHICLE SEAT BACK

BACKGROUND OF THE INVENTION

Gravity/inertia actuated latch elements of conventional simple one-piece construction are normally pivotally mounted on a forward tiltable seat back to engage a forward latch stop which may be on a fixed or on an angularly adjustable element of a recliner hinge which will inherently provide different angular latch stop positions for corresponding adjusted positions of the operative seat back angle. This together with extremities of vehicle inclination under either a parked condition where gravity actuated release is required or a driving condition where emergency inertia latch lock is required, impose a range of parameters which are not readily solved with any simple one-piece inertia latch wherein the range of angularity of the center of gravity of the latch relative to its pivot center provides an effective moment arm for each of the relatively opposing moments responsive to gravity and inertia which is a simple function of polar coordinates relative to horizontal and vertical lines extending from the pivot center.

Furthermore, with a single piece latch construction having adequate strength under latch engagement to resist maximum passenger loads against the seat back under crash deceleration conditions, inherent minimum limits of articulation between fully engaged and release positions as well as latch extensions for imposing a latch engagement orientation when the seat back is in operative position involve substantial inherent weight requirements for the inertia latch in order to achieve the limited optimum dependability which may be possible with a single piece inertia latch system.

SUMMARY OF THE PRESENT INVENTION

The present invention departs from the simple one-piece inertia latch to provide a multiple piece latch with compound resolution of the opposing gravity and inertia actuated forces whereby a relatively lighter weight of the inertia latch element may be employed to provide release actuation over a full range of seat back adjustment and parked vehicle inclination conditions; also to provide with such lighter weight a latch retention capability which is likewise operative over a full range of seat back adjustment and vehicle driving inclinations to meet required minimum deceleration values for retaining a locked condition of the inertia latch.

A number of modifications are disclosed herein with multiple components for achieving improvement over the simple one-piece inertia latch. Some include toggle linkage elements for amplifying the retaining force of inertia acting on a relatively light weight under emergency deceleration with such linkage being oriented to provide adequate latch release actuation when the vehicle is stationary; one modification employs a roller weight biased to produce an unlatching moment on an inertia latch element when the vehicle is stationary which is entirely neutralized when inertia force reaches a predetermined value; another modification employs a pendulum weight having adequate unlatching moment with the vehicle stationary which shifts under deceleration to minimize gravity bias and augment inertia retention of latched position. In certain of the embodiments weight of the inertia element is minimized by employing a high load capacity transverse pin as a stop element connected by a pivoted plastic linkage to an inertia weight which controls the latched and unlatched position of the cross pin. Finally a further modification employs a partially filled liquid chamber wherein mercury or other liquid is utilized as a shiftable gravity/inertia element movable to modify the respective effective gravity and inertia moments in response to deceleration of the vehicle.

In each of these modifications the gravity responsive weight employed for unlatching when the vehicle is stationary is minimized relative to that required in a simple one-piece inertia latch and is in some way neutralized to reduce or eliminate the unlatching moment when a given deceleration value has been reached in order to improve the latch retention propensity of the unit whenever the vehicle is in motion over that of a simple one-piece inertia latch wherein the entire unlatching moment must be counterbalanced by the deceleration responsive inertia moment to prevent the possibility of unlatching during deceleration.

BRIEF DESCRIPTION OF THE DRAWINGS

FIG. 1A is a fragmentary sectional view taken along the line 1A—1A of FIG. 1;

FIG. 1B is a fragmentary sectional view taken along the line 1B—1B of FIG. 1;

FIG. 3 is a side elevation of a third embodiment of the present invention including an angular adjustment for a recliner seat back;

FIG. 4 is a fragmentary side elevation of a fourth embodiment of a two-piece inertia latch;

FIG. 4A is a fragmentary side elevation of a fourth embodiment of a two-piece inertia latch; and FIG. 5 is a fragmentary side elevation of a fifth embodiment employing shiftable liquid gravity and inertia responsive element.

DETAILED DESCRIPTION OF THE DRAWINGS

Figure 1:
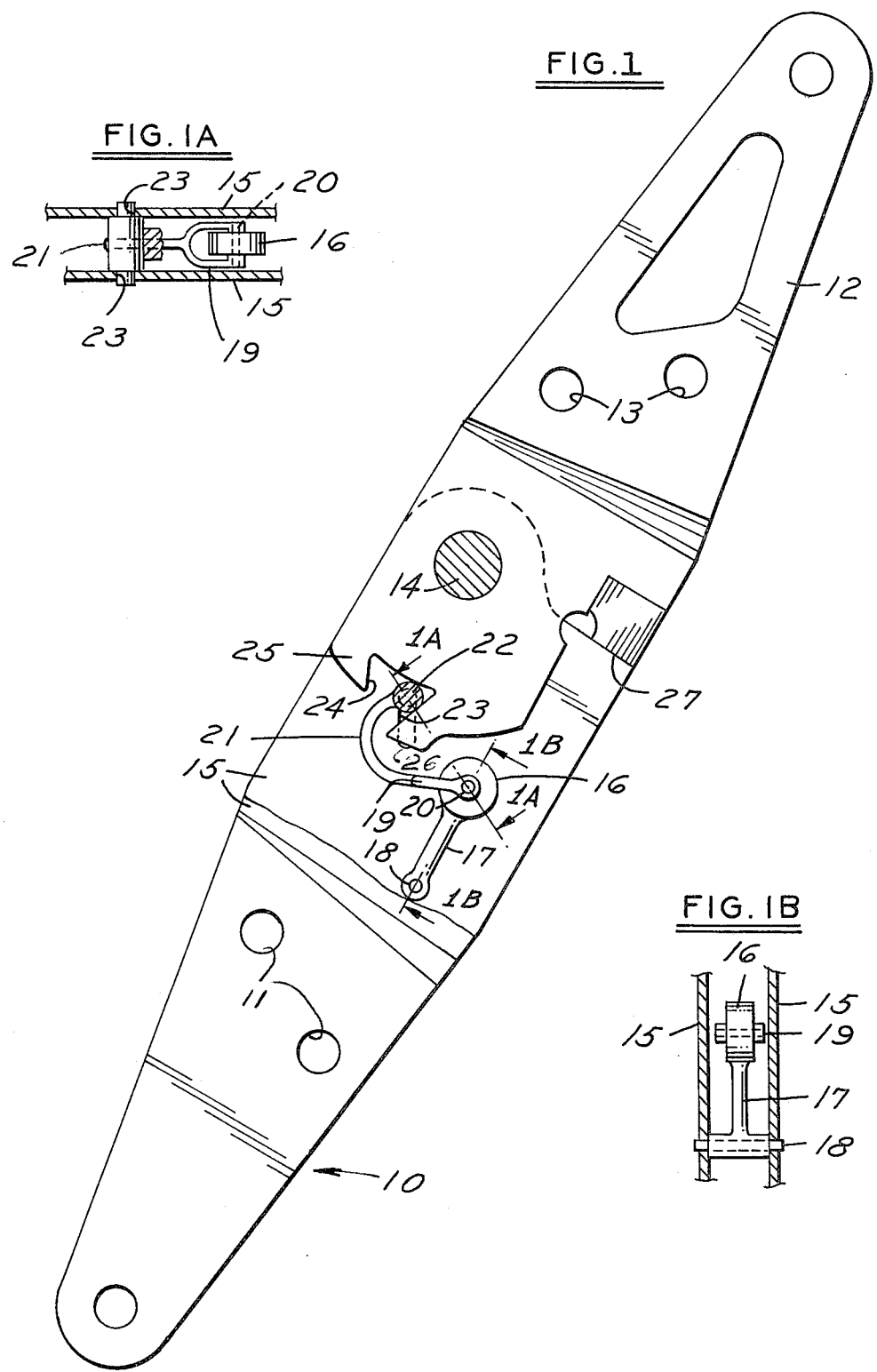
FIG. 1 is a side elevation of a seat back hinge incorporating a first embodiment of the inertia latch of the present invention.

With reference to FIG. 1 a seat back hinge incorporating a first embodiment of the present inertia latch invention comprises a two plate sandwich lower hinge bracket 10 adapted with mounting holes 11 for attachment to the lower seat frame and an upper single plate bracket 12 having mounting holes 13 adapted for attachment to a forward tiltable seat back and pivotally connected at 14 between the two spaced sandwich plates 15 of the lower bracket 10 one of which is broken away for clarity of disclosure of the internal inertia latch elements mounted therebetween which include the pendulum weight 16 attached to a plastic arm 17 pivotally connected at 18 to side plates 15 a plastic yoke 19 pivotally connected at 20 to pendulum weight 16 and having an arcuate extension 21 connected to cross pin 22 extending through slots 23 in side plates 15 and engageable with notched recess 24 in extension 25 of upper seat bracket 12. Cross pin 22 is also normally engaged by projection 26 in the lower extension of bracket 12 when the seat back in normal position established by a rear stop 27 formed by interengaging projections of the upper and lower hinge brackets.

When the vehicle is stationary initial forward tilting of the seat back about pivot 14 causes projection 26 to retract permitting pendulum weight 16 acting through plastic link 21 to lower cross pin 22 within slot 23 to a non-engaging position for latch projection 25 thereby permitting the seat back to tilt to a full forward position. When the seat back returns from its forward tilted position toward engagement with rear stop 27 the forward cam surface of projection 26 will engage cross pin 22 in its lowermost position within slot 23 and raise it to its latch engagement elevation as shown.

Figure 2:
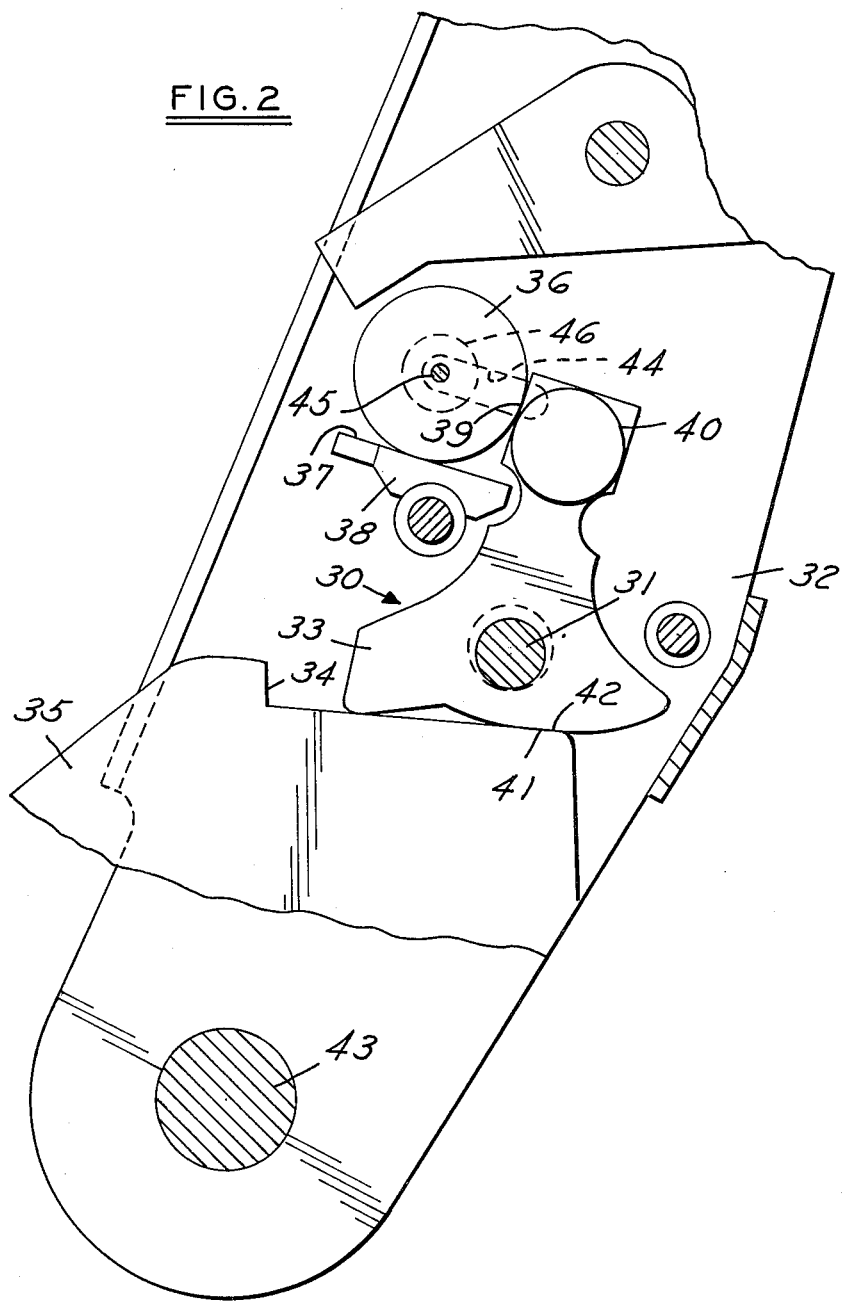
FIG. 2 is a fragmentary side elevation of a second embodiment of the present inertia latch invention.

Under deceleration conditions inertia acting on pendulum weight 16 causes it to lose its effective gravity actuated moment where the resultant of gravity and deceleration inertia pass through pivot 18 and any additional deceleration provides a toggle action through links 17 and 21 holding cross pin 22 in its elevated position With reference to FIG. 2 the latch in this case comprises latch dog 30 pivotally connected at 31 to seat back bracket 32 having a forward nose 33 adapted to engage notch 34 in a fixed or angularly adjustable seat back mounted element 35 upon forward tilting of the seat back under emergency deceleration conditions as hereinafter described.

When the vehicle is stationary a metal roller weight 36 supported on ramp surface 37 of a plastic support 38 fixed on seat bracket 32 provides a gravity biased roller imparted unlatching moment through contact 39 with latch dog extension 40. The angle of the ramp surface 37, in the order of $17\frac{1}{2}°$ for example, is sufficient under the least favorable opening requirements to cause unlatching articulation of the latch dog upon initial forward tilting of the seat back causing separation of the stop surface 41 of latch dog 30 from stop surface 42 on lower bracket element 35 which, in addition to serving as the rearward stop for the back rest, serves to retain latch dog 30 in its latch engagement attitude as shown against the opening bias of roller 36.

In this case the upper bracket 32 is formed with a two plate sandwich construction enclosing the above described latch elements and pivotally connected at 43 to single plate lower bracket mounted element 35 which may be an adjustable ratchet plate for a recliner seat back, as known in the art, or may be rigidly connected to or part of the lower seat bracket. A pair of slots 44 in the upper bracket plates limits the travel of roller 36 provided with projecting pin 45, and a pair of low friction plastic washers 46 serve as side guides for roller 36 assuring free travel on the ramp surface 37.

It will be seen that under vehicle deceleration the bias load of roller 36 on latch dog extension 40 in a counterclockwise direction disappears when deceleration inertia balances the bias resulting from the $17\frac{1}{2}°$ component of gravity acting on the roller. It will also be noted that the center of gravity of the roller weight 36 may be located forwardly of pivot 31 and still exert a counterclockwise moment through reaction and vertical component of ramp surface 37 which in turn absorbs the entire gravity force acting on roller 36 as soon as deceleration inertia equals the ramp angle component of the gravity force.

With this arrangement a more dependable gravity release action is possible than where, as conventional in prior art inertia latches, the center of gravity of the latch dog per se, such as illustrated, is alone depended upon to produce an unlatching moment since a relatively short horizontal moment arm renders such unit more sensitive to seat back adjustment and vehicle inclination in park position. In addition the arrangement of the FIG. 2 embodiment permits the effective weight to operate on a longer moment arm than is possible in relying solely on the center of gravity of the latch dog per se.

With reference to FIG. 3 illustrating an embodiment which incorporates an adjustable recliner back rest, lower seat bracket 47 has pivotally mounted thereon at 48 adjustable ratchet plate 49 engaged in adjusted position by teeth of pawl extension 50 pivotally mounted at 51 to bracket 47 with ratchet teeth 52 held in locked position by engagement of cam surface 53 of the cam member 55 pivotally mounted at 56 to lower bracket 47 between side plates 57 with back surface 54 of pawl extension 50; said cam being released upon retraction of manual handle 58 against tension of spring 59 by engagement of cross pin 60 with slot 61 formed in extension 62 of the release handle.

Spring clip 64 retained by a "V" groove in taumel drive shaft 48 has projection 65 for engaging a manual taumel knob, not shown, for producing a finer adjustment of the seat back position than is possible with the ratchet teeth 52 which may be used for rapid course adjustment upon actuation of release handle 58. Back stop pin 66 engaged by recesses 67 in side sheets of bracket 63 limit the back rest return to any adjusted position following forward movement controlled by inertia latch.

The inertia latch in this case comprises cross pin 68 confined within slots 69 in side sheets of bracket 63 and held in the position shown by bellcrank lever 74 pivoted at 75 through engagement of extension 76 with cam surface 77 formed in the latch plate 49 upon movement of the back rest to its operative back stop position, cross pin 68 is engageable with notch 70 formed in ratchet plate 49 upon sudden deceleration of the vehicle causing inertia operating on weight 71 to remain in forward position shown within retainer 72 extending between brackets 63 thereby acting through link 73 to retain cross pin 68 at engagement elevation within slot 69.

When the vehicle is stationary and the seat back is tipped forward, cam surface 77 is disengaged by bellcrank extension 76 permitting bellcrank 74 to be raised by cross pin 68 lifted by link 73 through downward rolling of weight 71 on ramp surface 78 of retainer 72 to dotted line position 71a.

The ramp surface 78 here, as in the embodiment of FIG. 2, has an appropriate angle such as to assure gravity release when the vehicle is stationary over the complete range of seat adjustment and vehicle inclination parameters for which the release is required while providing a means for neutralizing the gravity release component of weight 71 when deceleration inertia equals the effective gravity component established by the ramp 78.

With reference to the FIGS. 4 and 4A embodiment, latch dog 79, generally similar in construction and operation to the embodiment of FIG. 2, is provided with a pendulum weight 80 pivotally suspended at 81 within slots 82 formed in plastic cap 83 secured at 84 to metal portion 85 of latch dog 79.

The full line position of pendulum 80 as shown will be maintained whenever the vehicle is stationary through inclination of the slot 82 with sufficient gravity actuated moment arm to release the latch upon forward tilting of the back rest. In response to predetermined deceleration of the vehicle, pendulum 80 will shift to dotted line position 80a minimizing the horizontal gravity moment relative to latch pivot 86 thereby rendering the inertia latch more sensitive to vehicle deceleration than would be possible with a single piece inertia latch of the same general configuration.

Finally the embodiment of FIG. 5 employs latch dog 87 similar to latch dog 79 of FIG. 4 wherein sealed hollow 88 of appropriate configuration is partially filled with mercury or other suitable liquid biased to produce latch disengagement upon forward tilting of the seat back when the vehicle is stationary and to shift upon deceleration of the vehicle to minimize the unlatching gravity component of the liquid to again render the latch more sensitive to deceleration inertia for retaining latch engaging position.

As previously stated all of the embodiments effectively reduce, minimize or entirely eliminate the latch disengaging gravity actuated moment in response to vehicle deceleration in order to faciliate a more dependable latch release with a minimum gravity/inertia weight over the full range of seat adjustment and vehicle inclination while at the same time maximizing the sensitivity of the latch to vehicle deceleration effective to retain latch engagement, again over the full range of any seat back adjustment and vehicle inclination, at the time emergency deceleration requires latch retention for engagement to lock the seat back against forward tilting.

In the case of FIGS. 2, 3, 4 and 5 embodiments it will be noted that inertia supplements gravity upon rapid forward seat tilting with the vehicle stationary to assist in rapidly moving the latch element to release position.

We claim:

1. Gravity/inertia actuated latch for hinged vehicle seat back rest comprising pivotally connected hinge members mountable respectively on vehicle seat and back rest components, interengaging fixed and gravity-/inertia actuated latch means mounted on said hinge members operative upon sudden vehicle deceleration to arrest back rest forward tilting, means responsive to operative back rest position to maintain said latch means oriented for interengagement, gravity/inertia actuated latch biasing means effective upon initial forward seat back tilting to release said latch means when said vehicle is stationary and to maintain said latch means in interengaging orientation upon initial forward seat back tilting under emergency vehicle deceleration conditions, and characterized by a composite latch construction including a gravity/inertia responsive mass element and separate latch engaging element, interconnecting means between said elements effective when the vehicle is stationary to move said latch engaging element of said latch means to a latch release position upon initial forward seat back tilting, and means responsive to vehicle deceleration for reducing the effective latch disengaging bias of said mass element and thereby also reduce the inertia value required to overcome said gravity bias and prevent latch disengagement under vehicle deceleration, said latch means including pivoted toggle linkage means connecting said latch engaging and mass elements adapted to neutralize said gravity unlatching bias in response to inertia imposed by vehicle deceleration.

2. Gravity/inertia acutated latch as set forth in claim 1 wherein said latch engaging element comprises a cross pin connected to one end of said toggle linkage, vertical slots in spaced components of one of said hinge members accommodating movement of said cross pin into latch engaging and disengaging positions, notch means on the other of said hinge members interposed between said spaced components for engagement by said cross pin when at one extremity of such slots and release of said pin when at the other extremity of said slots.

3. Gravity/inertia actuated latch as set forth in claim 2 wherein said slots, cross pin and inertia mass element are mounted within spaced components of said seat hinge, and said pin is in the latch engaging position at the upper extremity of said slots.

4. Gravity/inertia actuated latch for hinged vehicle seat back rest comprising pivotally connected hinge members mountable respectively on vehicle seat and back rest components, interengaging fixed and gravity-/inertia actuated latch means mounted on said hinge members operative upon sudden vehicle deceleration to arrest back rest forward tilting, means responsive to operative back rest positon to maintain said latch means oriented for interengagement, gravity/inertia actuated latch biasing means effective upon initial forward seat back tilting to release said latch means when said vehicle is stationary and to maintain said latch means in interengaging orientation upon initial forward seat back tilting under emergency vehicle deceleration conditions, and characterized by a composite latch construction including a gravity/inertia responsive mass element and separate latch engaging element, interconnecting means between said elements effective when the vehicle is stationary to move said latch engaging element of said latch means to a latch release position upon initial forward seat back tilting, and means responsive to vehicle deceleration for reducing the effective latch disengaging bias of said mass element and thereby also reduce the inertia value required to overcome said gravity bias and prevent latch disengagement under vehicle deceleration, and wherein said latch engaging element comprises a cross pin extending within slot means provided in said back rest hinge member, adjustable ratchet plate means for varying the operative back rest position, manually releasable pawl means for holding said ratchet plate in adjusted position, notch means in said ratchet plate engageable by said cross pin to arrest forward tilting of the seat back, ramp means fixed on said seat back hinge member downwardly inclined in a rearward direction, roller mass means on said ramp means having a linkage connection to said cross pin adapted upon downward travel of said roller on said ramp means to raise said pin within said slot means to a latch release position, said means responsive to operative back rest position to maintain said latch means oriented for interengagement comprising cam means in said ratchet plate, and lever means pivoted on said back rest hinge member engageable with said cam means adapted to move said cross pin to latch engaging position in response to seat back rest movement to its operative position.

5. Gravity/inertia actuated latch for hinged vehicle seat back rest comprising pivotally connected hinge members mountable respectively on vehicle seat and back rest components, interengaging fixed and gravity-/inertia actuated latch means mounted on said hinge members operative upon sudden vehicle deceleration to arrest back rest forward tilting, means responsive to operative back rest position to maintain said latch means oriented for interengagement, gravity/inertia actuated latch biasing means effective upon initial forward seat back tilting to release said latch means when said vehicle is stationary and to maintain said latch means in interengaging orientation upon initial forward seat back tilting under emergency vehicle deceleration conditions, and characterized by a composite latch construction including a gravity/inertia responsive mass element and separate latch engaging element, interconnecting means between said elements effective when the vehicle is stationary to move said latch engaging element of said latch means to a latch release position upon initial forward seat back tilting, and means responsive to vehicle deceleration for reducing the effective latch disengaging bias of said mass element and thereby also reduce the inertia value required to overcome said gravity bias and prevent latch disengagement under vehicle deceleration, and wherein said latch engaging element is pivotally mounted on said seat back rest hinge member with an upward extension above the pivotal connection, ramp means fixed on said seat back hinge member downwardly inclined toward said upward extension, and roller weight means on said ramp means with guide means accommodating contact with said upward extension to effect a latch releasing bias on said extension when the vehicle is stationary proportional to the vertical component of said ramp surface, and means for orienting said roller weight to respond to vehicle deceleration inertia neutralizing said gravity actuated latch opening bias.

6. Gravity/inertia actuated latch for hinged vehicle seat back rest comprising pivotally connected hinge members mountable respectively on vehicle seat and back rest components, interengaging fixed and gravity-/inertia actuated latch means mounted on said hinge members operative upon sudden vehicle deceleration to arrest back rest forward tilting, means responsive to operative back rest position to maintain said latch means oriented for interengagement, gravity/inertia actuated latch biasing means effective upon initial forward seat back tilting to release said latch means when said vehicle is stationary and to maintain said latch means in interengaging orientation upon initial forward seat back tilting under emergency vehicle deceleration conditions, and characterized by a composite latch construction including a gravity/inertia responsive mass element and separate latch engaging element, interconnecting means between said elements effective when the vehicle is stationary to move said latch engaging element of said latch means to a latch release position upon initial forward seat back tilting, and means responsive to vehicle deceleration for reducing the effective latch disengaging bias of said mass element and thereby also reduce the inertia value required to overcome said gravity bias and prevent latch disengagement under vehicle deceleration, and wherein said latch engaging element is pivotally mounted on said seat back rest hinge member with an upwardly extending cap housing, pendulum weight means pivotally suspended within said cap, the center of gravity of said pendulum weight being located to exert a latch opening bias on said latch engaging element when said vehicle is stationary, and to swing in response to vehicle deceleration in a direction reducing the effective latch opening moment arm of said pendulum weight.

7. Gravity/inertia actuated latch as set forth in claim 6 wherein said pivotal mounting of said pendulum weight includes an inclined slot normally positioning said pendulum weight for exerting maximum latch opening bias on said latch engaging element when the vehicle is stationary, said slot accommodating a shift of pivotal center of said pendulum weight in response to vehicle deceleration in a direction reducing the effective horizontal moment arm relative to pivotal center as well as through pendulum swinging of said weight.

8. Gravity/inertia actuated latch for hinged vehicle seat back rest comprising pivotally connected hinge members mountable respectively on vehicle seat and back rest components, interengaging fixed and gravity-/inertia actuated latch means mounted on said hinge members operative upon sudden vehicle deceleration to arrest back rest forward tilting, means responsive to operative back rest position to maintain said latch means oriented for interengagement, gravity/inertia actuated latch biasing means effective upon initial forward seat back tilting to release said latch means when said vehicle is stationary and to maintain said latch means in interengaging orientation upon initial forward seat back tilting under emergency vehicle deceleration conditions, and characterized by a composite latch construction including a gravity/inertia responsive mass element and separate latch engaging element, interconnecting means between said elements effective when the vehicle is stationary to move said latch engaging element of said latch means to a latch release position upon initial forward seat back tilting, and means responsive to vehicle deceleration for reducing the effective latch disengaging bias of said mass element and thereby also reduce the inertia value required to overcome said gravity bias and prevent latch disengagement under vehicle deceleration, and wherein said latch engaging element is pivotally mounted on said back rest hinge member with an enclosed partially liquid filled cavity having a center of gravity which with the vehicle stationary biases said element toward latch release position, said cavity being contoured to accommodate a shift in the center of gravity of said liquid in response to vehicle deceleration to effect said reduction in inertia value required to overcome said gravity bias.

* * * * *